(12) United States Patent
Kitazawa et al.

(10) Patent No.: US 7,155,234 B2
(45) Date of Patent: Dec. 26, 2006

(54) CONNECTION ACCEPTANCE CONTROL SCHEME BY OBTAINING AVAILABLE QUALITY VALUE

(75) Inventors: Daisuke Kitazawa, Yokohama (JP); Hijin Sato, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 482 days.

(21) Appl. No.: 10/026,814

(22) Filed: Dec. 27, 2001

(65) Prior Publication Data

US 2002/0123314 A1 Sep. 5, 2002

(30) Foreign Application Priority Data

Dec. 28, 2000 (JP) ............................. 2000-402957

(51) Int. Cl.
*H04Q 7/20* (2006.01)
(52) U.S. Cl. ............................. 455/452.2; 455/435.2; 455/509
(58) Field of Classification Search ................ 455/450, 455/452.1, 452.2, 62, 422.1, 434, 435.1, 455/435.2, 500, 507, 509
See application file for complete search history.

(56) References Cited

U.S. PATENT DOCUMENTS

| | | | | |
|---|---|---|---|---|
| 5,504,939 A | * | 4/1996 | Mayrand et al. | 455/450 |
| 5,687,171 A | * | 11/1997 | Shin et al. | 370/335 |
| 5,826,169 A | * | 10/1998 | Natarajan | 455/13.1 |
| 5,884,174 A | * | 3/1999 | Nagarajan et al. | 455/436 |
| 6,014,556 A | * | 1/2000 | Bhatia et al. | 455/404.1 |
| 6,400,954 B1 | * | 6/2002 | Khan et al. | 455/450 |
| 6,834,193 B1 | * | 12/2004 | Linderborg et al. | 455/450 |

FOREIGN PATENT DOCUMENTS

| | | |
|---|---|---|
| EP | 0 750 440 | 12/1996 |
| EP | 0 913 968 | 5/1999 |
| JP | 5-227193 | 9/1993 |
| JP | 11-69431 | 3/1999 |

OTHER PUBLICATIONS

S. Jamin, et al., Computer Communication Review, vol. 25, No. 4, pp. 2-13, XP-000541646, "A Measurement-Based Admission Control Algorithm for Integrated Services Packet Networks", Oct. 1, 1995.

ACTS Project AC085, Wireless, ATM Network Demonstrator, pp. 1-63, XP-002201817, "Deliverable 1D5 Wand System Specification", Aug. 31, 1998.

R. -F. Chang, et al., Personal, Indoor and Mobile Radio Communications, IEEE International Symposium, pp. 623-627, XP-010209246, "QOS-Based Call Admission Control for Integrated Voice and Data in CDMA Systems", Oct. 15, 1996.

* cited by examiner

*Primary Examiner*—Lana Le
*Assistant Examiner*—Nhan T. Le
(74) *Attorney, Agent, or Firm*—Oblon, Spivak, McClelland, Maier & Neustadt, P.C.

(57) ABSTRACT

A determination part obtains an available communication quality value from required communication quality values of terminals currently on connection, and a maximum permissible communication quality value determined according to a design of the radio communication system, and, when the available communication quality value is larger than a required communication quality value of a new terminal, the determination part accepts connection for the new terminal.

18 Claims, 16 Drawing Sheets

CONNECTION ACCEPTANCE CONTROL SCHEME BY OBTAINING AVAILABLE QUALITY VALUE

BACKGROUND OF THE INVENTION

1. Field of the Invention

The present invention relates to a connection acceptance control scheme in a packet switching radio communication system, and, in particular, relates to a acceptance control apparatus and a new-connection acceptance control method for determining acceptance/refusal of new connection of a terminal/session based on a required communication quality of each terminal/session which requests connection.

2. Related Art

A radio communication system mainly employing an application by sound is one called a circuit switching type. This system will now be described with reference to FIG. 1.

FIG. 1 shows an outline of a channel configuration of a circuit switching type radio communication system. In the circuit switching type system, one terminal (or one session) occupies one channel, as shown in the figure. For example, when a terminal A makes a connection using a channel 1, as shown in the figure, the other terminals cannot use this channel 1.

This scheme is advantageous for the terminal A as a fixed communication quality is secured in order that no other terminals can use the channel during the communication thereof.

On the other hand, a packet switching type system is also spread for a wide use recently. This system will now be described with reference to FIG. 2. FIG. 2 shows an outline of a channel configuration according to the packet switching type radio communication system.

In the packet switching type system, information data is handled in a form of data collections called packets for transmitting it. According to this system, differently from the above-described circuit switching type system, packet including information is transmitted only when data occurs.

Although this packet switching type system has a somewhat difficulty for voice communication by the reason of severe requirement against a time delay, higher efficiency can be attained in data communication in which data to be transmitted occurs intermittently. Moreover, since each terminal transmits packets using a vacant channel, it is possible to occupy one channel by a plurality of terminals, and thus, a free time of each channel can be utilized effectively, as shown in the figure.

Although the packet switching type system is advantageous as channel use efficiency and communication efficiency can be improved, communication quality may be degraded when communication data in the entire system increases much. This problem will now be described with reference to FIGS. 3A, 3B, 4A and 4B.

FIGS. 3A and 3B show an outline of a channel configuration of the packet switching type system. First, terminals A, B, and C perform communication by using one certain channel (see FIG. 3A). Then, it is assumed that terminals D and E newly start packet communication using the same channel (see FIG. 3B). Since packets may collide and may be lost when a plurality of terminals transmit packets simultaneously by one channel, a timing of transmitting each packet should be finely controlled so as not to be transmitted simultaneously, as shown in FIG. 3B.

In case only few radio resources remain, and, thereby, a congestion state occurs, when the terminals D and E which require connection newly start using the same channel, resources allocated to the terminals (or packets) which are already under connection should be reduced so that the thus-obtained resources may be allocated to the newly participating terminals D and E. That is, the throughput on the terminals A, B, and C which have already carried out the packet transmission decreases, and the number of packets which can be transmitted thereby decreases, accordingly. Thereby, also for the terminals D and E, the number of packets used for data transmission should be limited, accordingly.

Thus, according to the related art, the resources allocated should be changed according to the number of terminals to be newly connected. Thereby, a time (or the number of packets) which can be used by each terminal for data transmission changes accordingly, and, thus, the communication quality such as a throughput may not be secured for each of all the terminals under connection.

Thus, according to the related art, not only the communication quality for the terminals on connection may not be secured, but also the communication quality for the terminals which are newly accepted for connection is not secured. Accordingly, the required communication qualities for the respective terminals may not be satisfied.

In a packet switching type system (or a circuit switching type system) in the related art, in case a connection request accompanied by a communication quality (such as a throughput, a permissible delay time, and so forth) has been made by a terminal, the system determines, based on factors such as the amount of remaining resources, magnitude of interference power, and so forth, whether or not the required quality can be satisfied, i.e., whether or not the connection can be accepted. Thus, the system controls acceptance of new connection so as to prevent the bit error rate or packet error rate from being lowered from a predetermined level.

FIGS. 4A and 4B illustrate such an acceptance control scheme performed based on interference power. FIGS. 4A and 4B typically show an outline of the acceptance control performed based on interference electric power in a packet switching type system according to the related art.

In this example, a single radio base station communicates with a plurality radio terminals, and each terminal has a buffer. It is assumed that, a terminal C newly requests a connection with a required permissible delay time in a state in which terminals A and B are on connection with the base station (see FIG. 4A).

In such a case, according to the related art, the system measures the interference electric powers on the terminals A, B, and C. Then, based on the measurement result, when it has been determined that communication quality is satisfied for all the terminals, the system gives a connection acceptance to the terminal C (see FIG. 4B).

However, when the communication quality which the terminal C requires is of a permissible delay time as mentioned above, even when the connection acceptance has been determined based on the interference electric power, the required permissible delay time may not be guaranteed for the terminal C. Thus, when the acceptance control is performed only based on a factor (interference electric power, the amount of remaining resources, etc.) other than the required communication quality factors (throughput, permissible delay time, etc.), the required communication quality of each terminal may not be satisfied.

In summary, the above-mentioned problem described with reference to FIGS. 3A and 3B occurs as a result of connection acceptance being made without previously setting the maximum number terminals which can connect by one channel, and without regarding the required communication quality of each terminal. Further, the problem described with reference to FIGS. 4A and 4B occurs as a result of connection acceptance being made not based on the parameter same as the required communication quality on each terminal.

In contrast thereto, a packet switching system may be assumed by which packet communication is performed with the maximum number of terminals which can be connected by one channel is previously set. In such a system, since the number of terminals contained in one channel does not exceed the predetermined number, the communication quality can be secured for each terminal. However, new connection is not accepted after accepting the predetermined number of terminals, even when the channel is not actually used thereby, since the number of terminals containable by one channel is previously set. Therefore, the communication channel usage efficiency may be degraded.

SUMMARY OF THE INVENTION

The present invention has been devised in order to solve the above-mentioned problems, and, to secure a required communication quality for a terminal which newly requires connection, without degrading the usage efficiency of radio resources, such as communication channels, and also, without degrading the communication qualities on the respective terminals already under connection.

An acceptance control scheme, used in a radio communication system, according to the present invention, includes:

receiving a connection request signal and a required communication quality value from a new terminal which newly requires connection with the system;

holding only the required communication quality values on the terminals for each of which connection has been accepted; and determining acceptance/refusal of the connection for the new terminal;

wherein:

the determination part obtains an available communication quality value from the required communication quality values of the terminals currently on connection, and a maximum permissible communication quality value determined according to the design of the radio communication system, and, when the available communication quality value satisfies the required communication quality value of the new terminal, the determination part accepts connection for the new terminal.

Thereby, as shown in FIG. 15, only in case the required quality value of the new terminal is smaller (longer, in case where the communication quality type is a delay time or the like) than the available quality value, remaining after use of the resources by sum of the required quality values on the currently connected terminals, the new terminal can be accepted to be connected to the system. Thus, the communication quality of each terminal currently on connection can be prevented from being lowered from the respective required qualify value even after the connection has been made for the new terminal.

An acceptance control scheme, used in a radio communication system, according to another aspect of the present invention, includes:

receiving a connection request signal and a required communication quality value from a new terminal which newly requires connection with the system;

obtaining a communication quality type of the thus-received required communication quality, measuring the communication quality values on the terminals currently on connection for the thus-obtained communication quality type, and holding the measurement values; and determining acceptance/refusal of the connection for the new terminal;

wherein:

an available communication quality value is calculated from the measurement values of the communication quality type held as mentioned above, and a maximum permissible communication quality value of the radio communication system, and, when the available communication quality value satisfies the required communication quality value of the new terminal, the connection for the new terminal is accepted.

Thereby, as shown in FIG. 16, only in case the required quality value is smaller (longer, in case where the communication quality type is a delay time or the like) than the available quality value, remaining after use of the resources by sum of the measured quality values on the currently connected terminals, the new terminal can be accepted to be connected to the system. Thus, the communication quality of each terminal currently on connection can be prevented from being lowered from the respective currently measured qualify value even after the connection has been made for the new terminal.

An acceptance control scheme, used in a radio communication system, according to another aspect of the present invention, includes:

receiving a connection request signal and a required communication quality value from a new terminal which newly requires connection with the system;

holding only the required communication quality values on the terminals for each of which connection has been accepted;

obtaining a communication quality type of the required communication quality of the new terminal received as mentioned above, measuring the communication quality values on the terminals currently on connection for the thus-obtained communication quality type, and holding the thus-obtained measurement values; and determining acceptance/refusal of the connection for the new terminal;

wherein:

an available communication quality value is calculated from the required communication quality values of the terminals currently on connection held as mentioned above but only for the terminals for each of which the measurement value is more superior than the required value, the measurement values of the communication quality type held as mentioned above but only for the terminals for each of which the measurement value is less superior than the required value, and a maximum permissible communication quality value of the radio communication system, and;

when the available communication quality value satisfies the required communication quality value of the new terminal, the connection for the new terminal is accepted.

Thereby, as shown in FIG. 17, only in case the available quality value, remaining after use of the resources by sum of the required quality values on the currently connected terminals for each of which the measured value more superior (be larger, in case where the communication quality type is a throughput or the like, and, be shorter, in case where the communication quality type is a delay time or the like) than the required value, and the measured quality values on the currently connected terminals for each of which the measured value is less superior than the required value, can satisfy (be larger, in case where the communication quality type is a throughput or the like, and, be shorter, in case where the communication quality type is a delay time or the like) the required quality value of the new terminal, the new terminal can be accepted to be connected to the system.

Thus, the communication quality of each terminal currently on connection but for which the measurement value exceeds the required value can be prevented from being lowered from the respective required quality values, and, also, the communication quality of each terminal currently on connection but for which the measurement value is less than the required value can be prevented from being lowered from the respective currently measured qualify value, even after the connection has been made for the new terminal.

Accordingly, according to the present invention, it is possible to perform connection acceptance control in consideration of balance in communication quality which each terminal under connection can receive, and, also, to utilize the communication resources efficiently.

BRIEF DESCRIPTION OF THE DRAWINGS

Other objects and further features of the present invention will become more apparent from the following detailed description when read in conjunction with the following accompanying drawings.

DESCRIPTION OF THE PREFERRED EMBODIMENTS

Figure 1:
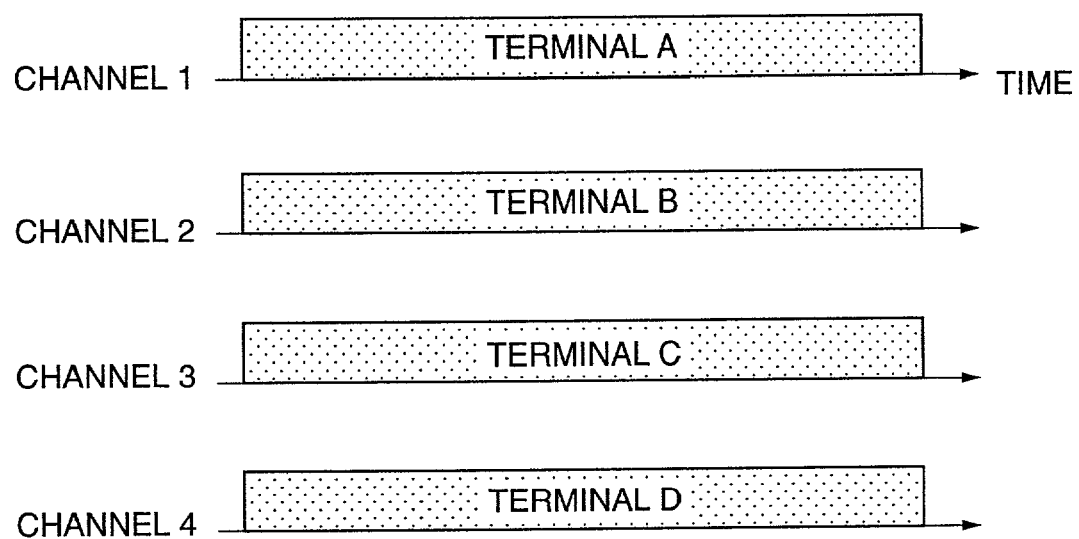
FIG. 1 shows an outline of a channel configuration in a circuit switching type radio communication system in the related art.
Figure 2:
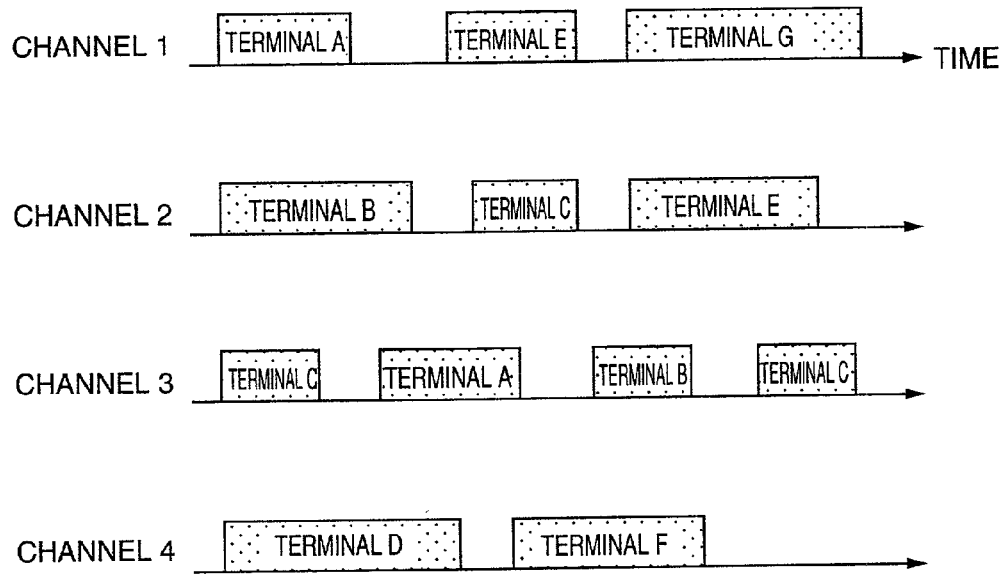
FIG. 2 shows an outline of a channel configuration in a packet switching type radio communication system in the related art.
Figure 3A:
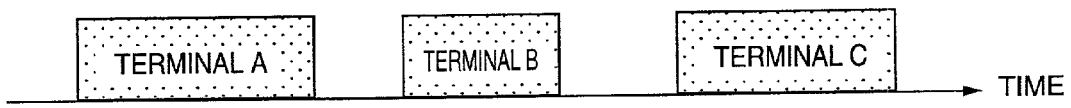
FIGS. 3A and 3B show an outline of a channel configuration in the packet switching type system in the related art for illustrating a state in which the number of terminals under connection increases.
Figure 3B:
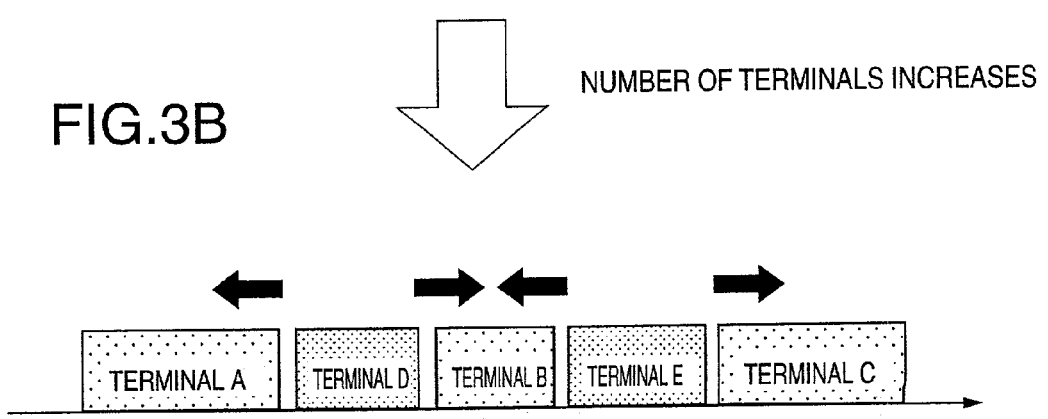
Figure 4A:
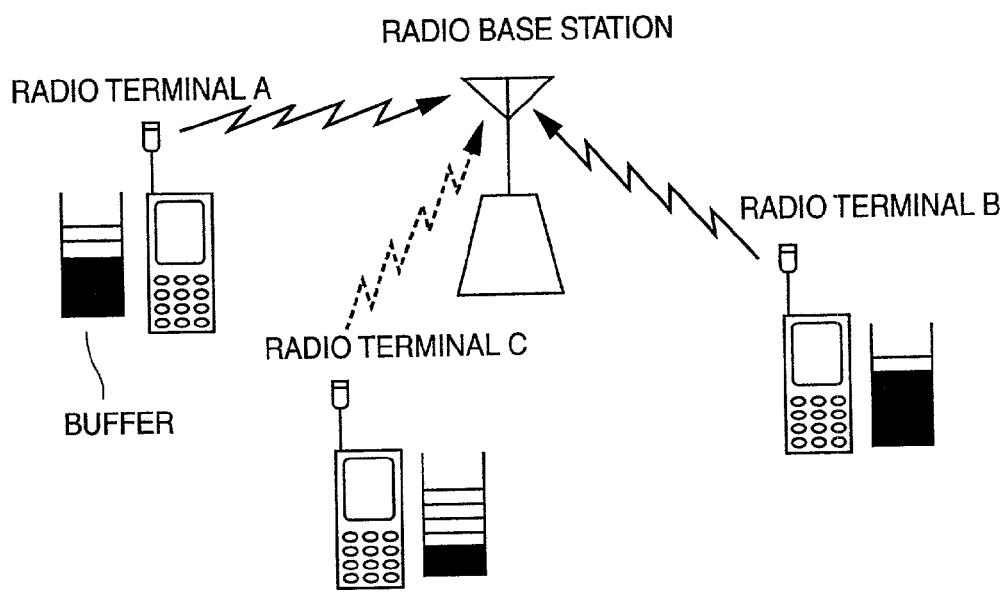
FIGS. 4A and 4B illustrate an outline of acceptance control based on interference power in the packet switching type system in the related art.
Figure 4B:
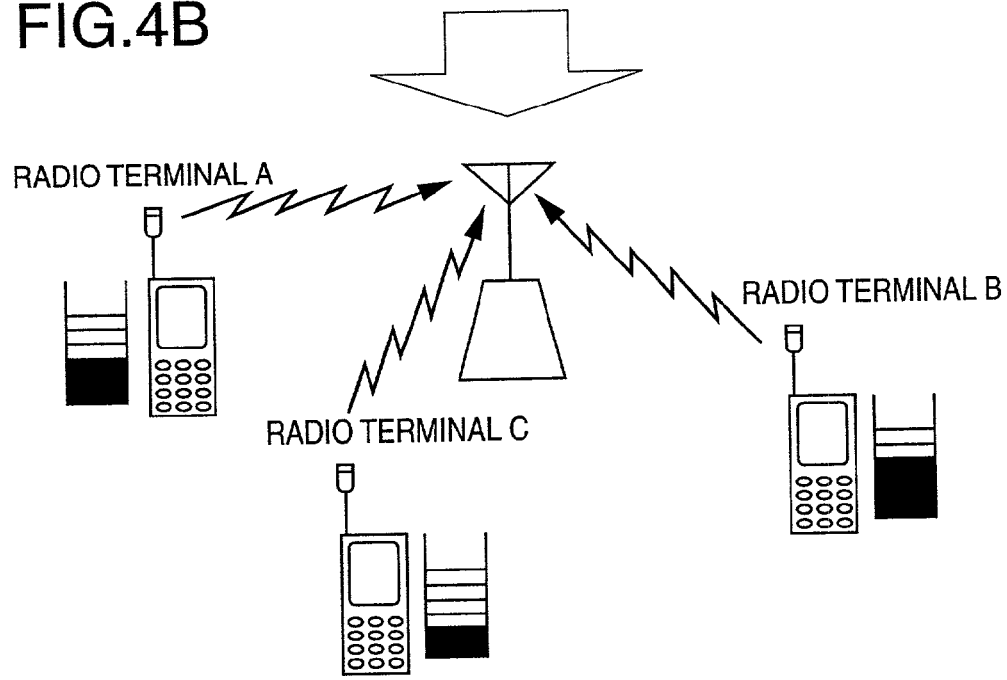

Embodiments of the present invention will now be described with reference to drawings. The same reference numerals are given to the same parts/components throughout the drawings.

An acceptance control apparatus according to the present invention is an apparatus controlling acceptance of new connections, and does not need to be located at a specific place in a radio communication system. That is, an acceptance control apparatus according to the present invention may be provided in a base station apparatus or in a radio-communication terminal, or may be provided individually therefrom. In other words, an acceptance control apparatus according to the present invention may have any form, i.e., a fixed station apparatus or a mobile station apparatus.

Although a case will be described where an acceptance control apparatus according to the present invention is included in a base station apparatus of a fixed station, the present invention is not limited to such a form.

First, an outline of a radio communication system assumed as an example for describing the embodiments of the present invention will now be described with reference to FIGS. 5 and 6. This is a general configuration and may be applied to all the embodiments which will be described.

Figure 5:
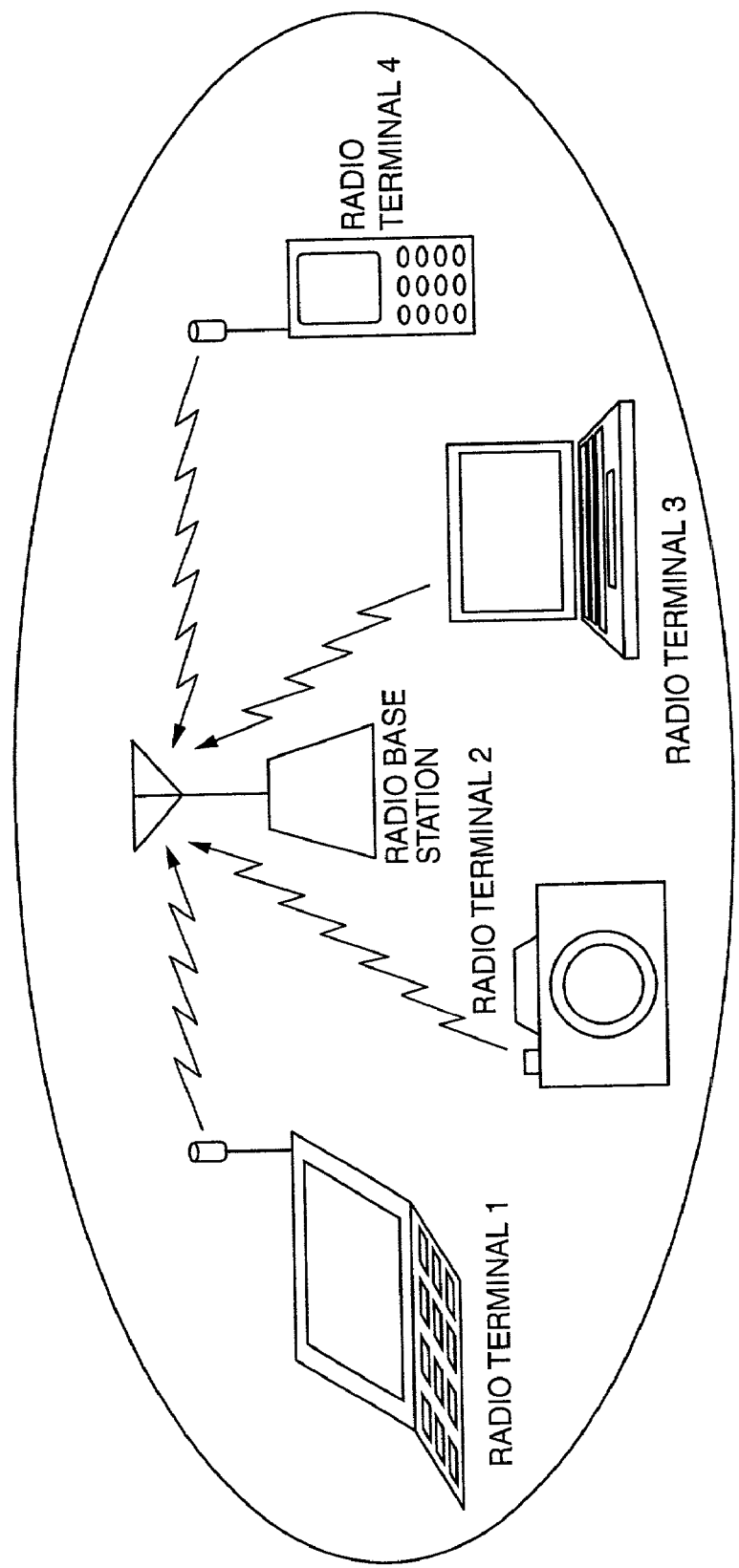
FIG. 5 shows an outline of a common radio communication system to which the present invention may be applied.

FIG. 5 shows an example of an outline of a common radio communication system. In this example, one radio base station covers a plurality radio terminals. That is, each of the plurality terminals performs telecommunication with the same base station in a service area which the base station provides. In such a system, radio resources which the base station has are used by the radio terminals which are under connection therethrough.

As shown in the figure, the radio terminals may be of any types, and the number thereof is not limited.

Figure 6:
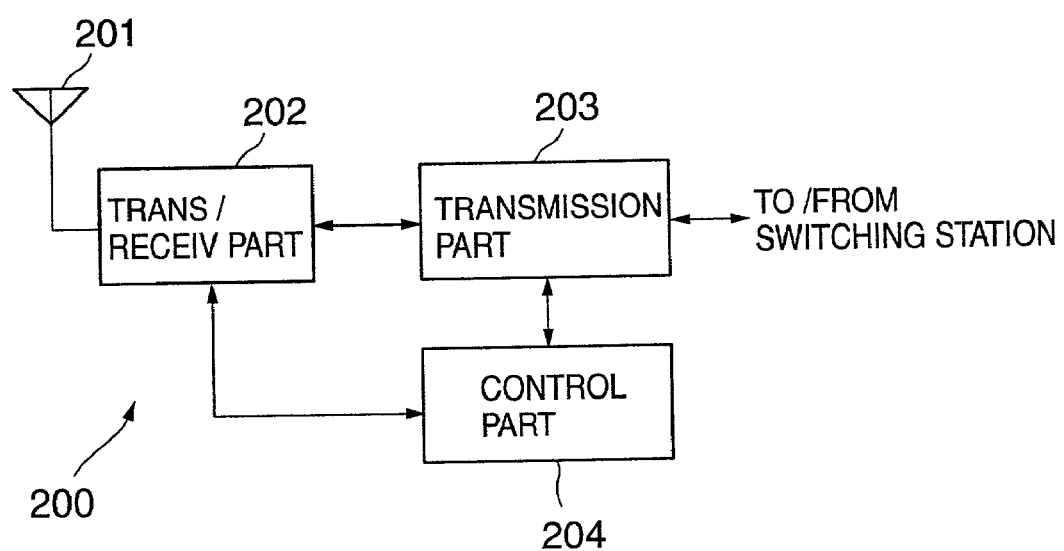
FIG. 6 is a block diagram showing a general configuration of a base station apparatus in a radio communication system shown in FIG. 5.

FIG. 6 is a block diagram showing a general configuration of a base station apparatus in the radio communication system such as that shown in FIG. 5. The base station apparatus 200 includes an antenna 201, a transmitting/receiving part 202 which performs radio transmission and reception (telecommunication), a transmission part 203 which acts as an interface with an external switching station, and a control part 204 which controls each part.

Hereinafter, each embodiment of the present invention will be described on the assumption that above-described common radio communication system and its base station apparatus are applied. In each embodiment, an acceptance control apparatus according to the present invention is included in the above-mentioned control part 204. In addition, "a specific calculation method for an available communication quality which can be achieved by the system" for each embodiment will be described further later in a summarized form.

A first embodiment according to the present invention will now be described.

A configuration and operation of an acceptance control apparatus 300 according to the first embodiment of the present invention will now be described with reference to FIGS. 7, 8 and 9.

Figure 7:
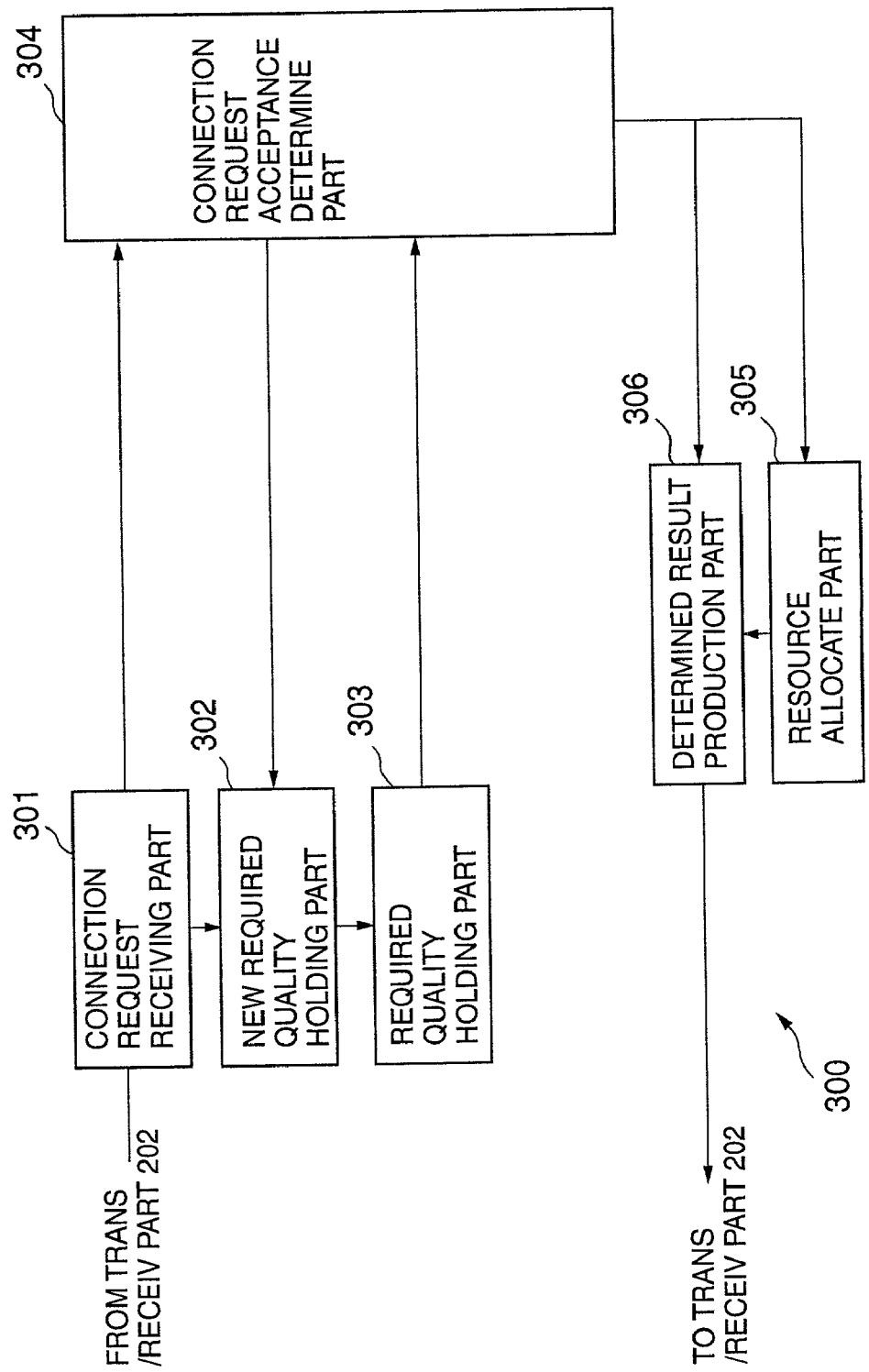
FIG. 7 is a block diagram showing a configuration of an acceptance control part according to a first embodiment of the present invention.
Figure 8:
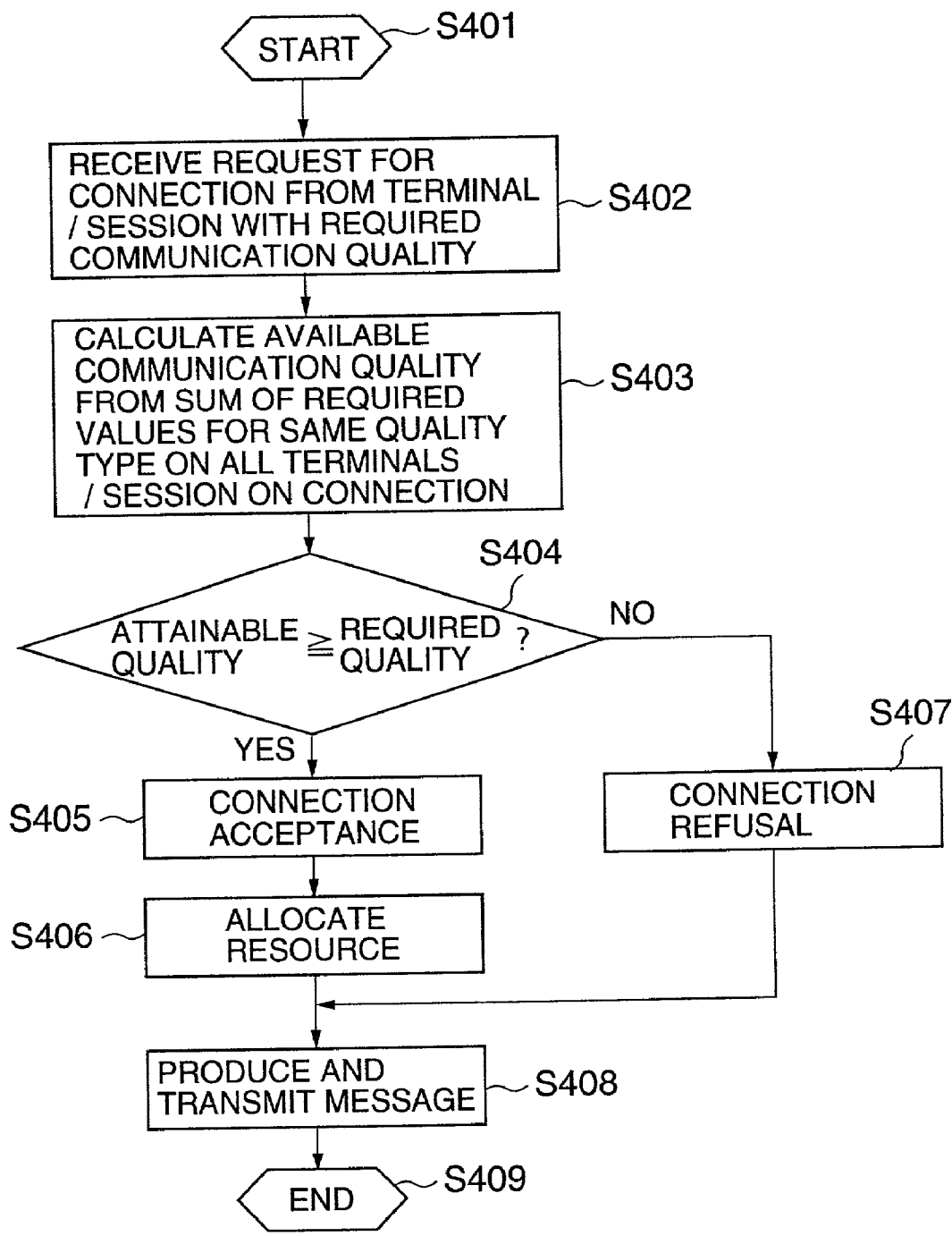
FIG. 8 is a flow chart which shows operation of the acceptance control part shown in FIG. 7.
Figure 9:
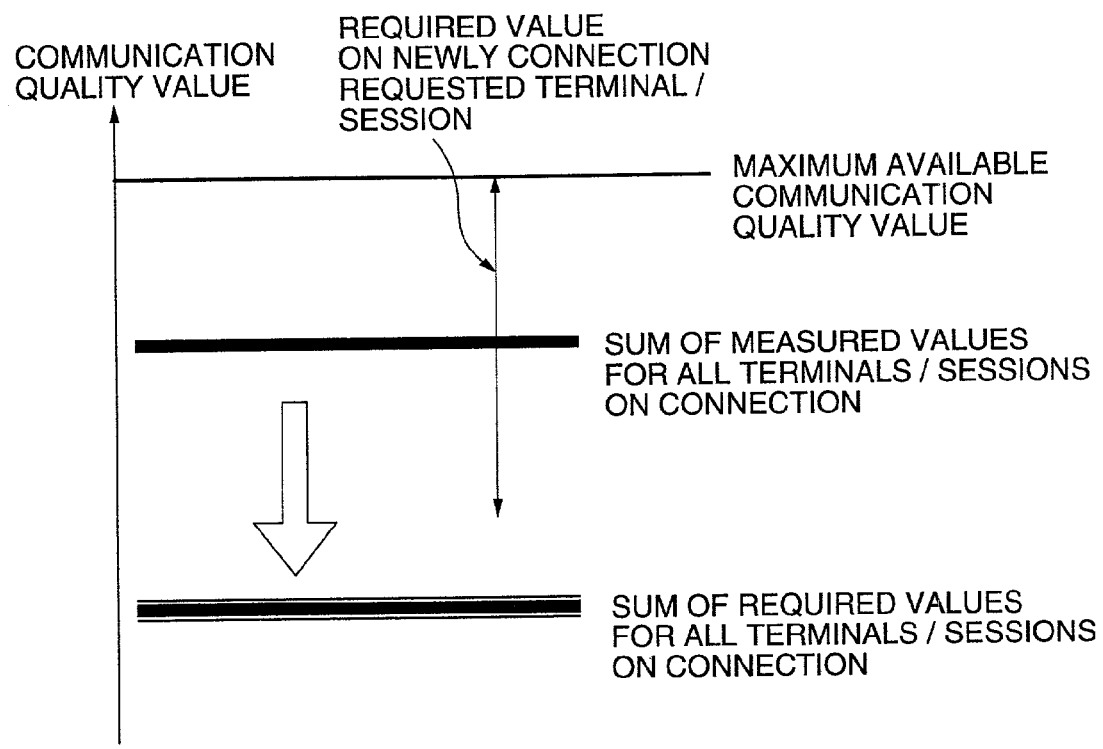
FIG. 9 illustrates a change in communication quality level for illustrating comparison processing performed by a connection request acceptance determination part shown in FIG. 7.

FIG. 7 is a block diagram showing a configuration of the acceptance control apparatus 300 according to the first embodiment, FIG. 8 is a flow chart which shows operation of the acceptance control apparatus 300, and FIG. 9 illustrates change in communication quality level in order to describe comparison processing performed by a connection request acceptance determination part 304 shown in FIG. 7.

First, the configuration will now be described with reference to FIG. 7. In FIG. 7, a connection request receiving part 301 receives a connection request signal and a required communication quality value transmitted from a terminal (or a session, referred to as "a terminal/session", hereinafter) which newly requires a connection, and transfers them to the connection request acceptance determination part 304. The required communication quality value is also transferred to a new request quality holding part 302.

The new request quality holding part 302 receives and holds/stores the required communication quality value (new required communication quality) of the terminal/session which newly requires a connection transmitted from the connection request receiving part 301. Then, the new request quality holding part 302 transfers the thus-stored new required communication quality value to a request quality holding part 303 when receiving a message indicating that connection has been accepted for the relevant terminal/session, from the control request acceptance determination part 304, but deletes it when receiving that it has been refused.

The request quality holding part 303 receives and holds/stores the required communication quality value on the terminal/session transferred from the new request quality holding part 302, when the connection has been accepted. That is, the request quality holding part 303 holds/stores the required communication quality values on all the terminals/sessions which are currently under connection.

The connection request acceptance determination part 304 sums the required communication quality values on the terminals/sessions under connection currently held/stored by the request quality holding part 303, and, therefrom, calculates an available communication quality, which can be attained. The thus-obtained available communication quality value is then compared with the new required communication quality value received by the connection request receiving part 301.

As a result of this comparison, it is determined that the relevant connection is accepted when the available communication quality value is higher than the new required communication quality value. However, the connection is refused when the opposite comparison result is obtained. Then, the connection request acceptance determination part 304 transfers this determination result to the new request quality holding part 302, a resource allocation part 305, and a determination result production part 306.

When a message indicating that the connection is accepted is received from the connection request acceptance determination part 304, the resource allocation part 305 allocates a resource for this connection, and informs, of this resource, the determination result production part 306.

The determination result production part 306 produces a message including the determination result for the connection acceptance determined by the connection request acceptance determination part 304, and transfers it to the terminal/session which required the connection. When the determination result is connection acceptance, information concerning the resource allocated by the resource allocation part 305 is also included in this message.

In addition, the communication quality type (or parameter) to be dealt with for the terminals/sessions under connection is the same as that of the required communication quality value of the terminal/session which newly requires connection. That is, according to the present embodiment, acceptance of a new terminal/session is determined only based on the required communication quality values on the terminals/sessions under connection.

Subsequently, a flow of processing and operation will now be described using FIG. 8. When the connection request acceptance determination processing is started (in a step S401), a connection request signal arises from a terminal/session which has a required value for communication quality is first received by the connection request receiving part 301, in a step S402.

Subsequently, in a step S403, the available communication quality is calculated from the sum of the required values in communication quality which the terminals/sessions currently under connection have, by the connection request acceptance determination part 304.

Subsequently, in a step S404, it is determined by the connection request acceptance determination part 304 as to whether the available communication quality value is equal to or higher than the required value on the newly connection requested terminal/session. In case the available communication quality value is higher than the new required communication quality value, the requested connection is accepted (S405) and a resource is allocated for this connection by the resource allocation part 305 in a step S406.

However, the required connection is refused when the available communication quality does not satisfy the required value on the newly connection requested terminal/session (S407).

Subsequently, in a step S408, a message containing the result (acceptance or refusal) with respect to the connection request and the resource allocated in case this reply is acceptance is produced by the determination result production part 306, and is transferred to the terminal which required the connection. Thus, the connection request acceptance determination processing is finished (S409).

Subsequently, the above-mentioned comparison processing performed by the connection request acceptance determination part 304 will now be described using FIG. 9. FIG. 9 shows a case where the sum of the measurement values of the communication quality for respective terminals/sessions under connection exceeds the sum of the required values. Then, it is assumed that, the maximum available communication quality value of the system is exceeded by the sum of the above-mentioned sum of the measurement values and a required value on a terminal/session which newly requires connection.

In this state, if the above-mentioned new request for connection on the terminal/session were accepted, the sum of the current actual communication quality values of the respective terminals/sessions on connection would become smaller than the above-mentioned sum of the measurement values before inserting the new connection. However, when the sum of the respective actual quality values is not smaller than the sum of the required values on the respective terminals/sessions, the required communication quality of each terminal/session on connection can be satisfied, even when the sum of the respective quality values is smaller than the sum of the previously measured values. Accordingly, as a result of acceptance control being performed not based on measurement values but based on required values of respective terminals/sessions under connection, a new terminal/session can be accepted, even in such a situation as that shown in FIG. 9.

Figure 15:
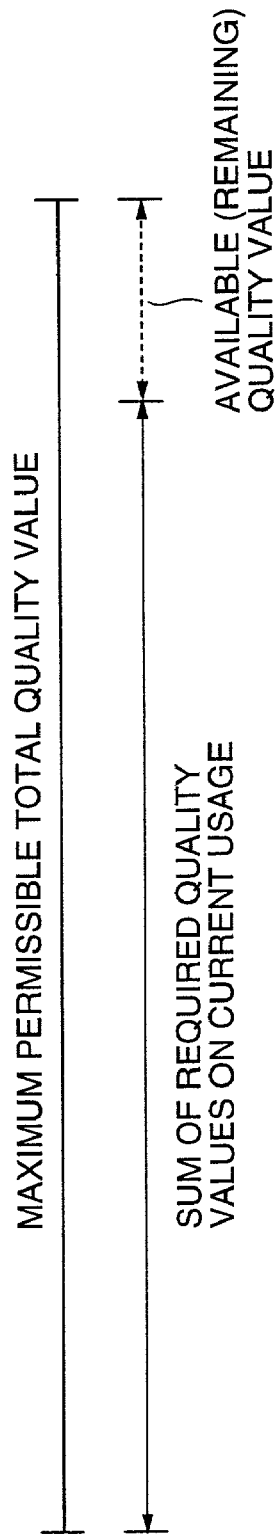
FIG. 15 illustrates a general concept of one aspect of the present invention.
Figure 16:
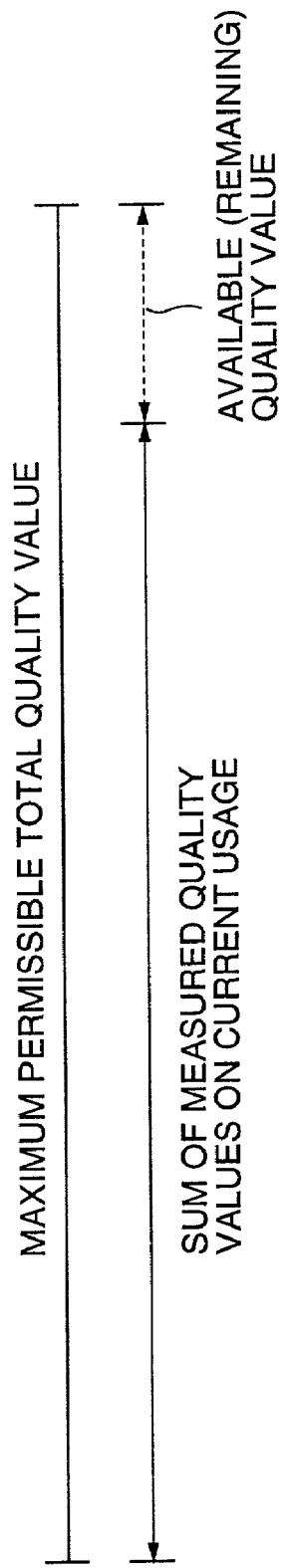
FIG. 16 illustrates a general concept of another aspect of the present invention.
Figure 17:
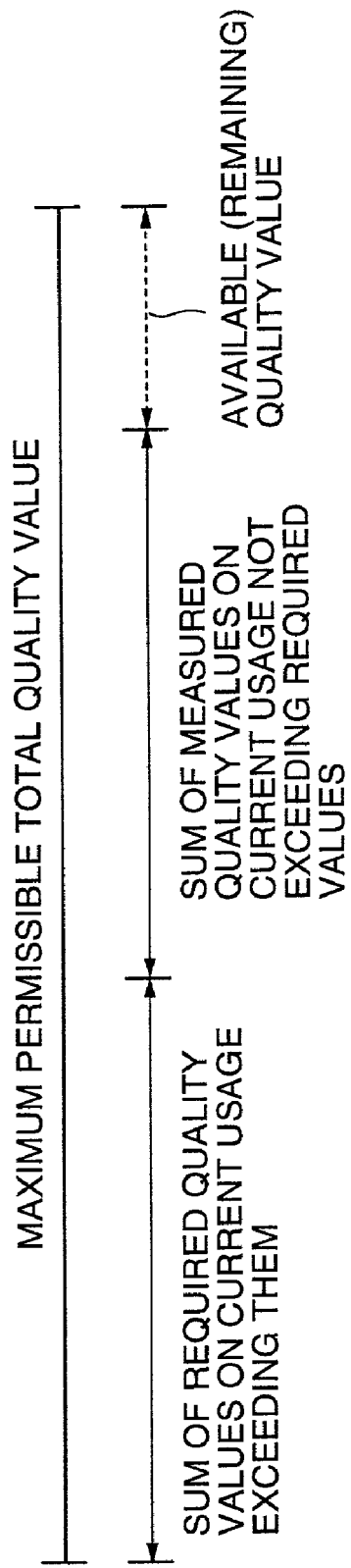
FIG. 17 illustrates a general concept of another aspect of the present invention.

Thus, according to the first embodiment of the present invention, acceptance control for terminals/sessions which newly require connection employs a condition of satisfying the required communication qualities of all the terminals/sessions on connection, as shown in FIG. 15.

A second embodiment of the present invention will now be described, with reference to FIGS. 10 through 12.

Figure 10:
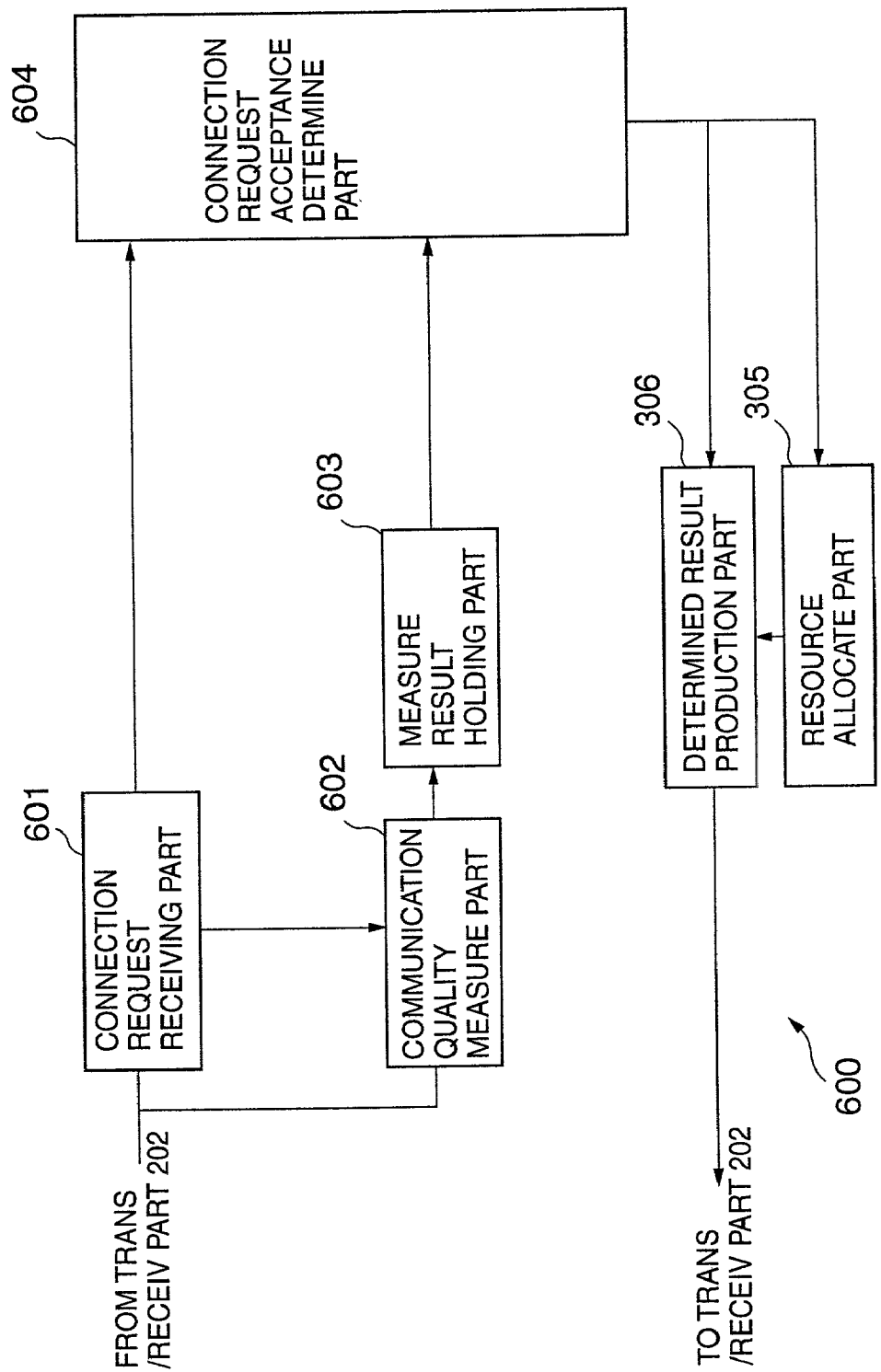
FIG. 10 is a block diagram showing a configuration of an acceptance control part according to a second embodiment of the present invention.
Figure 11:
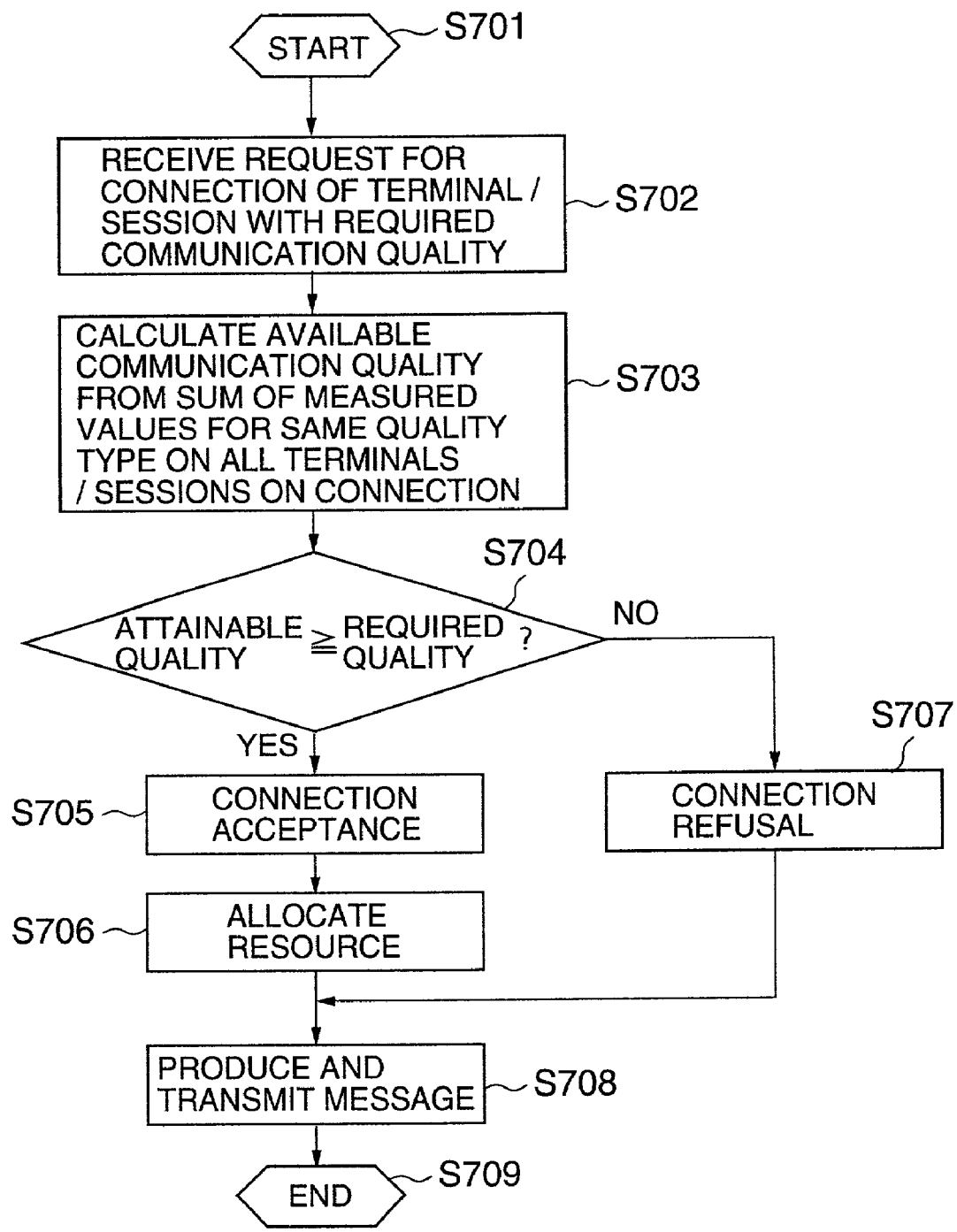
FIG. 11 is a flow chart which shows operation of the acceptance control part shown in FIG. 10.
Figure 12:
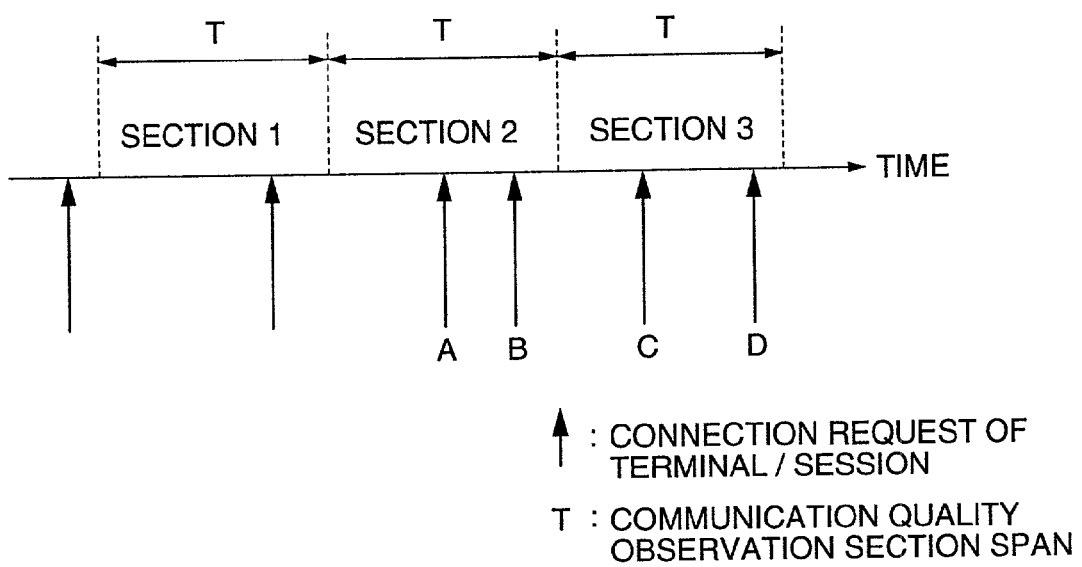
FIG. 12 illustrates measurement processing performed by a communication quality measurement part shown in FIG. 10.

FIG. 10 is a block diagram showing a configuration of an acceptance control apparatus 600 according to the second embodiment of the present invention, FIG. 11 is a flow chart which shows operation of the acceptance control apparatus 600, and FIG. 12 illustrates measurement processing performed by a communication quality measurement part 602, shown in FIG. 10.

First, the configuration will now be described using FIG. 10. In FIG. 10, the same reference numerals are given to the same parts/components as those of the above-described first embodiment, and description thereof is omitted.

A connection request receiving part 601 receives a connection request signal and a required communication quality value on newly requested connection transmitted from a terminal/session, and transfers them to a connection request acceptance determination part 604, which will be described later. Moreover, the communication quality type (or parameter) of the required communication quality is informed of to a communication quality measurement part 602 which will also be described later.

The communication quality measurement part 602 measures communication quality values on terminals/sessions on connection having required communication qualities, the thus-measured communication quality values being those of the communication quality type (parameter) same as that of the terminal/session mentioned above which has required a new connection.

A measurement result holding part 603 holds the above-mentioned measurement result of the communication quality measurement part 602.

The connection request acceptance determination part 604 sums the communication quality measurement values on the terminals/sessions under connection currently held by the measurement result holding part 603, and calculates an available communication quality value from the thus-obtained sum. The thus-obtained available communication quality value is compared with the above-mentioned new required communication quality value received by the connection request receiving part 601. As a result of the comparison, when the available communication quality value is larger than the new required communication quality value, the connection is accepted. Then, the connection request acceptance determination part 304 informs, of this determination result, a resource allocation part 305 and a determination result production part 306.

Thus, according to this embodiment, acceptance control is performed based on the communication quality measurement values on the terminals/sessions on connection having the required communication quality values, for the purpose of maintaining at worst the communication qualities on the terminals/sessions already on connection. There, the communication quality type (or parameter) measured is same as the type (or parameter) of the required communication quality which the terminal/session which newly requires connection has.

Accordingly, a new connection is accepted only for a new terminal/session, such that the sum of the measurement values of all the terminal/sessions under connection and the required value of the new terminal/session does not exceed the maximum available communication quality of the system.

An operation flow of the processing will now be described a using FIG. 11. When connection request acceptance determination processing is started (in a step S701), a connection request arising from a terminal/session which has a required value of communication quality is first received by the connection request receiving part 601, in a step S702.

Then, in a step S703, the available communication quality value is calculated from the sum of the communication quality measurement values on the terminals/sessions under connection at the current time, by the connection request acceptance determination part 604.

Subsequently, in a step S704, it is determined by the connection request acceptance determination part 604 as to whether the available communication quality value is equal to or larger than the required communication quality value on the terminal/session which newly requires connection. When the available communication quality value is larger than the new required communication quality value, the relevant connection is accepted for the terminal/session (in a step S705) and a resource is allocated to the thus-accepted connection by the resource allocation part 305 in S706.

On the other hand, the relevant connection is refused when the available communication quality value cannot satisfy the required communication quality value on the new terminal/session (in a step S707).

Subsequently, in a step S708, a message containing a reply (acceptance or refusal) with respect to the relevant connection request and the resource thus allocated in case this reply is acceptance is produced by the determination result production part 304, and is transferred to the terminal which required connection. The connection request acceptance determination processing is thus finished (in a step S709).

With reference to FIG. 12, the above-mentioned measurement processing performed by the communication quality measurement part 602 will be described now.

The current communication quality value of the terminal/session which has a required communication quality value is calculated as a communication quality value on a certain fixed observation section (referred to as a span T), and is updated for every elapse of section span T.

The updated communication quality values are used for determination for a connection request which arises during the subsequent section. For example, when connection requests A and B occur in the section 2, as shown in the figure, the communication quality values measured in the section 1 are used for acceptance control thereof. Similarly, when connection requests C and D occur in the section 3, the communication quality values measured in the section 2 are used for acceptance control thereof. Therefore, at the time of the end of each section, it is necessary to measure and hold the communication quality values on the terminals/sessions on connection for the relevant section.

The actual span of the above-mentioned observation section span T may be determined arbitrarily. However, as the span is shorter, the communication quality value on the terminal/session under connection can be made to be able to be reflected onto acceptance control at higher accuracy and required communication quality value will be satisfied with higher reliability. Accordingly, the shorter span is preferable. However, the processing performed by the base station becomes larger as the span T becomes smaller. Accordingly, an optimum span should be selected after taking the throughput of the base station into consideration for a particular system.

Thus, according to the second embodiment of the present invention, acceptance control of the terminal/session which newly requires connection can be performed on a condition such that the communication quality values of the terminals/sessions currently under connection may not be degraded therefrom due to insertion of the relevant new terminal/session.

A third embodiment of the present invention will now be described with reference to FIGS. 13 and 14.

Figure 13:
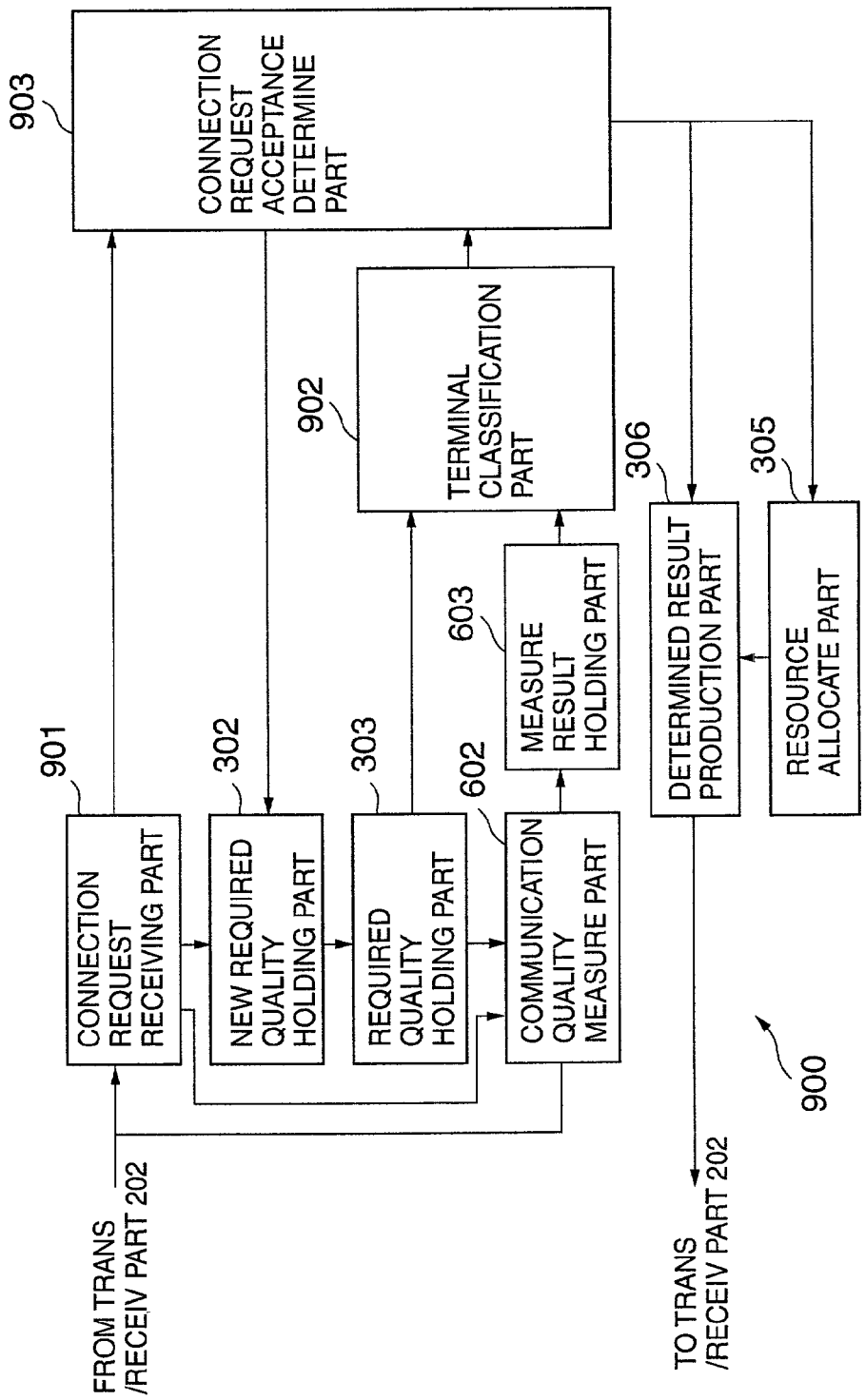
FIG. 13 is a block diagram showing a configuration of an acceptance control part according to a third embodiment of the present invention.
Figure 14:
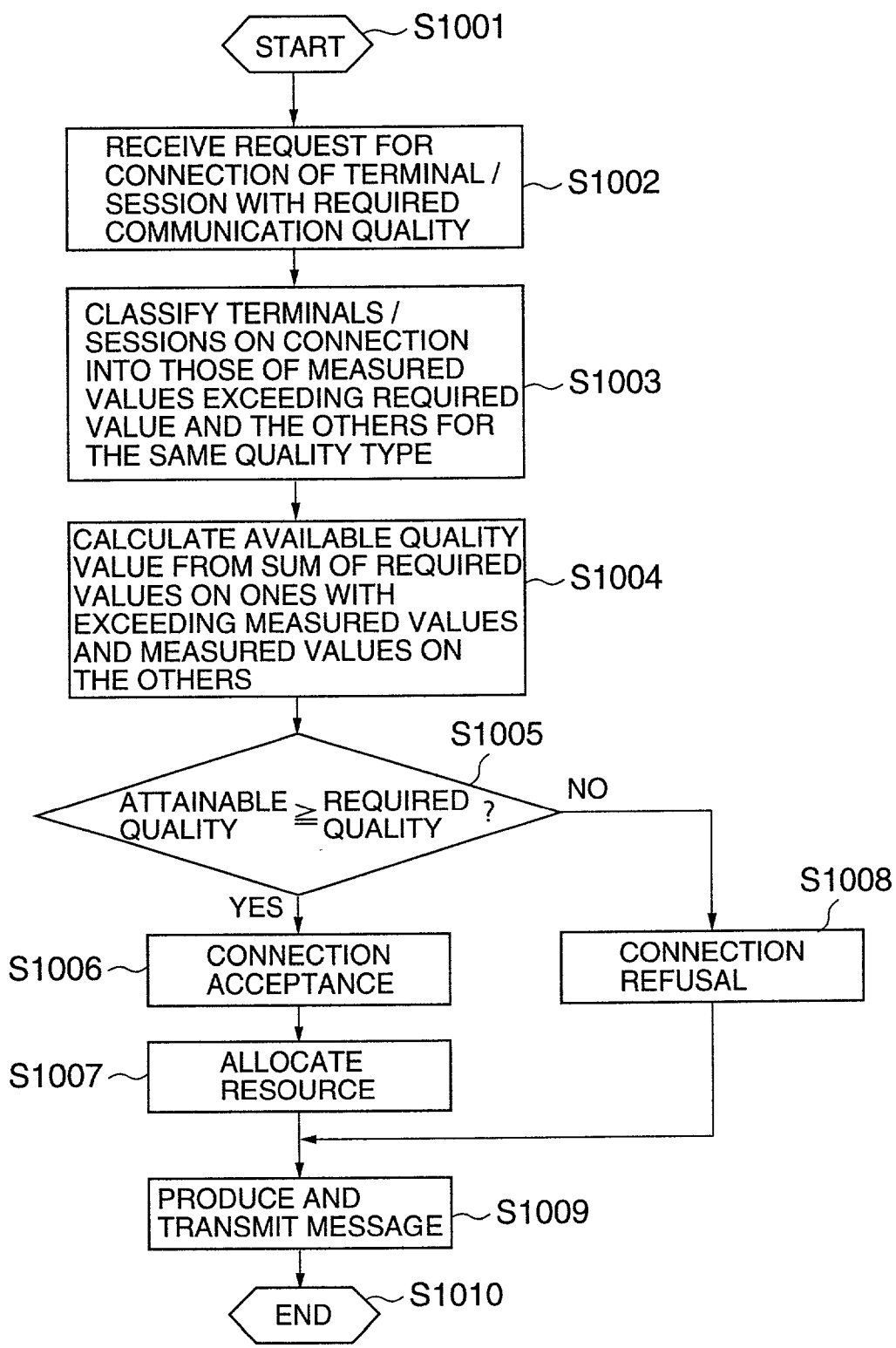
FIG. 14 is a flow chart which shows operation of the acceptance control part shown in FIG. 13.

FIG. 13 is a block diagram showing a configuration of an acceptance control apparatus 900 according to the third embodiment of the present invention, and FIG. 14 is a flow chart which shows operation of the acceptance control apparatus 900.

First, the configuration will now be described using FIG. 13. The same reference numerals are given to parts/components same as those of the above-described first and second embodiments, and description thereof is omitted.

A connection request receiving part 901 receives a connection request signal which newly requires connection and a required communication quality value thereon, transmitted from a terminal/session, and transfers them to a connection request acceptance determination part 903. Moreover, this required communication quality value is also transferred to a new request quality holding part 302. Furthermore, the required communication quality type (or parameter) thereof is informed of to a communication quality measurement part 602.

A terminal classification part 902 classifies the terminals/sessions currently under connection into those for which the measurement values in communication quality exceed the require values, respectively, and those for which the measurement values in communication quality do not exceed the require values, respectively, after inquiring and thus obtaining the required values in communication quality for the respective terminals/sessions from the request quality holding part 303.

The connection request acceptance determination part 903 sums ① the required communication quality values of the respective terminals/sessions under connection, for each of which the measurement value exceeds the required value, held by the required quality holding part 303, and ② the communication quality measurement values of the terminals/sessions under connection, for the terminal/sessions for each of which the measurement value does not exceed the required value, currently held by the measurement result holding part 603.

Then, the connection request acceptance determination part 903 calculates the available communication quality value from the thus-obtained sum. Then, the thus-obtained available communication quality value is compared with the new required communication quality received by the connection request receiving part 301. There, for the terminals/sessions for which the measurement value is equal to the required value, they may be classified either one of the above-mentioned category ① or the category ②.

Then, as a result of the comparison, the connection request acceptance determination part 903 determines to accept the relevant connection, when the available communication quality value is larger than the required quality value of new terminal/session, but determines to refuse the relevant connection when the available communication quality value is less than the required quality value. Then, the connection request acceptance determination part 903 transmits this determination result to the new request quality holding part 302, the resource allocation part 305, and the determination result production part 306.

Thus, this embodiment calculates the available communication quality value based on the required values on the terminals/sessions for each of which the measured communication quality value exceeds the required communication quality value, as in the above-described first embodiment, and on the measured communication quality values on the terminals/sessions for each of which the measured communication quality value does not exceed the required communication quality value as in the above-described second embodiment.

With reference to FIG. 14, an operation flow of the third embodiment will now be described. When the connection request acceptance determination processing is started (in a step S1001), a connection request arising from a terminal/session which has a required value in communication quality is first received by the connection request acceptance part 302 in a step S1002.

Subsequently, in a step S1003, the measurement values in communication quality of the terminals/sessions under connection measured and stored for the section immediately preceding to the time at which the relevant connection request signal arrived are classified into those for each of which the relevant measurement value exceeds the respective required value and those for each of which the respective measurement value does not exceed the respective required value, by the terminal division-into-equal-parts part 902.

Subsequently, in a step S1004, ① the required communication quality values on the terminals/sessions under connection for each of which the measured communication quality value exceeds the required value held by the required quality holding part 303, and ② the measured communication quality values on the terminals/sessions under connection for each of which the measured communication quality value does not exceed the required value, are summed, and, from the thus-obtained sum, the available communication quality value is calculated by the connection request acceptance determination part 903.

Subsequently, in a step S1005, the connection request acceptance determination part 903 determines whether the thus-calculated available communication quality is larger than the relevant new required communication quality value. When the available communication quality value is equal to or larger than the relevant new required communication quality value, the relevant connection is accepted (in a step S1006) and a resource is allocated for this connection by the resource allocation part 305 in S1007.

In the other hand, when the available communication quality value is smaller than the relevant new required communication quality value, the relevant connection is refused (in a step S1008).

Subsequently, in a step S1009, a message containing the reply (acceptance or refusal) to the relevant connection request and indicating the resource allocated when this reply is acceptance is produced by the determination result production part 306, and is transmitted to the terminal which required the relevant connection. Thus, the connection request acceptance determination processing is finished (in a step S1010).

Thus, according to the present embodiment, in a situation in which terminals/sessions for each of which the measured communication quality value exceeds the required value and terminals/sessions for each of which the measured communication quality value does not exceed the required value, the acceptance control for a terminal/session requesting new connection is performed in a condition in which, at worst the required communication quality is secured for the terminals/sessions for each of which the measured value has exceeded the required value, and, at worst, the measured communication quality at that time is secured for the terminals/sessions for each of which the measured value does not exceed the required value.

A specific example of a calculation method for the available communication quality value according to each of the above-described embodiments will now be described.

With regard to the required communication quality type (or parameter) on terminals/sessions, a case where this quality type is throughput ① and a case where this quality type is permissible delay time ② will now be described, for example.

First, the case where the required communication quality on terminals/sessions is a throughput ① will now be described. The throughput S is defined as follows:

S=(amount of information transmitted by one section)/(observation section span T)

There, the unit of the above-mentioned amount of information is bit or packet, and the unit of the span T is second.

In packet telecommunication, also information re-transmitted as it has not been received properly uses a channel. Therefore, when measuring the throughput of a terminal/session under connection in order to use the measured throughput for the acceptance control, the amount of information actually transmitted through the communication channel should be measured. That is, the throughput measured should include packets occurring reception error, and the required throughput should take information re-transmitted into account.

The above-mentioned definition formula for the throughput means an average transmission rate of all data to be transmitted during connection on the terminal/session. The transmission rate changes every moment in a packet switching type system, and, thus, the above-mentioned average transmission rate means an average transmission rate occurring during the above-mentioned section (span T) or during an interval between the connection start and connection end.

Such a requirement is made mainly by an application which has a strict requirement for a transmission delay time on connection and also needs a constant information transmission rate, such as that for transmitting speech/voice, moving pictures, or the like.

Based on the above definition, a calculation method according to the above-described first embodiment will now be described first.

According to the first embodiment, the available communication quality value is calculated based on the required communication quality values on the terminals/sessions under connection. It is assumed that the radio resources used is telecommunication channels, for example.

Hereinafter, R denotes a transmission rate (bps) of the communication channel determined by a communication band width thereof; Ru denotes a communication channel occupation rate; S denotes a throughput (bps) required by a terminal/session which newly requests connection; Sdi denotes a required throughput (bps) on each terminal/session (i) currently on connection having a required communication quality value; and K denotes the number of terminals/sessions currently on connection having the required communication quality values.

The communication channel occupation rate Ru is obtained by dividing the average transmission rate with respect to all the terminals/sessions by the channel transmission rate R. The average transmission rate with respect to all the terminals/sessions is obtained from summing the average transmission rate Sdi which each terminal/session on connection should use with respect to i=1 through K. Accordingly, Ru is obtained by the following formula (1)

$$Ru = \frac{\sum_{i=1}^{K} Sdi}{R} \quad (1)$$

There, since the expected available throughput for the terminal/session which newly requires connection can be expressed by R·(1−Ru), the requirement for this terminal/session to be accepted is expressed as follows:

R·(1−Ru)≧S

The specific example of calculation method according to the second embodiment will now be described. In the second embodiment, the available communication quality value is calculated based on the communication quality measurement values on the terminals/sessions under connection.

Hereinafter, Ru' denotes a communication channel occupation rate which is a rate of the average transmission rate of transmission/reception information in one section with respect to R; Smi denotes a measured throughput of a terminal/session (i) currently on connection having a required communication quality value; and Ci denotes an amount of all the information transmitted during one section by the terminal/session (i) on connection having the required communication quality value including information re-transmitted.

In case of using the measurement values for determining the available communication quality value, Ci is measured for every section (for T seconds) for each of the terminals/sessions currently under connection which has a required communication quality value. Since Ci is the total amount of information received during one section (for T seconds), the average transmission rate Smi of this terminal/session on this section, i.e., throughput, is obtained by the following formula:

Smi=Ci/T

The communication channel occupation rate Ru' is obtained from dividing the average transmission rate of the information transmitted by this channel during one section (for T seconds) by the channel transmission rate R. The average transmission rate of the information transmitted by this channel during one section (for T seconds) can be obtained by summing Smi with respect to i=1 through K. Accordingly, Ru' can be obtained by the following formula (2):

$$Ru' = \frac{\sum_{i=1}^{K} Smi}{R} = \frac{\sum_{i=1}^{K} Ci}{RT} \quad (2)$$

There, since the estimated available throughput for the terminal/session which newly requires connection can be expressed as R·(1−Ru'), the requirement for this terminal/session to be accepted can be expressed by the following formula:

R·(1−Ru')≧S

There, any terminal/session which has terminated connection during a section during which a connection request is transmitted by a terminal/session which newly requires connection is excluded from those for which the above-mentioned measurement is made.

A specific example of calculation method according to the above-described third embodiment will now be described. According to the third embodiment, the available communication quality value is calculated based on the required values for the terminals/sessions on connection for each of which the measured communication quality value exceeds the required value and the measured values for terminals/sessions on connection for each of which the measured communication quality value does not exceed the required value. Terminals/sessions for each of which the measured value is equal to the required value (Sdi=Smi) may be classified to either one. In this example, such terminals/sessions are classified to those for each of which the measured value exceeds the required value.

Hereinafter, Sdi denotes the required communication quality value on the terminal/session (i) currently on connection for which the measured value exceeds or is equal to the required value; L denotes the number of terminals/sessions currently under connection for each of which the measured value exceeds or is equal to the required value; Smj denotes the measured communication quality value on the terminal/session (j) currently on connection for which the measured value is less than the required value; and M denotes the number of those currently under connection for each of which the measured value is less than the required value.

Then, the available communication channel occupation rate Ru is obtained by the following formula (3):

$$Ru = \frac{\sum_{i=1}^{L} Sdi + \sum_{j=1}^{M} Smj}{R} = \quad (3)$$

There, since the estimated available throughput for the terminal/session which newly requires connection can be expressed by $R \cdot (1-Ru)$, the requirement for this terminal/session to be accepted can be expressed by the following formula:

$$R \cdot (1-Ru) \geq S$$

Thus, the specific calculation methods have been described for the cases the throughput is employed as the required communication quality type (or parameter). The throughput may be defined as a probability of data being received properly.

A case where a permissible delay time is employed as the required communication quality type on terminals/sessions will now be described. Here, a delay time occurring mainly by a radio link portion (between a radio base station and a radio terminal) is considered, and a delay time D is defined as follows:

$$D = \text{(time when a packet is received properly)} - \text{(time when transmission of the packet is started)}$$

This delay time D is obtained by measuring the transmission delay time on the packet which has been received properly by the reception end. This measurement is performed in such a manner that a radio resource is previously allocated to a packet, the time at which transmission thereof is started is recorded on a header part thereof, and, therefrom, the time at which this packet is properly received by the reception end is subtracted.

Further, the delay time D is a time elapsed until a packet is finally received properly in case re-transmission is made. The delay time of the packet received improperly but for which no re-transmission is made is excluded from the measurement.

In case the permissible delay time is employed, first, a resource usage rate which is a rate of an actually used resource amount for the packet transmission with respect to all the resources that the system has is calculated first, subsequently the delay time of the terminal/session under connection is measured, and the available transmission delay for the new terminal/session is estimated based on these results.

The resource usage rate U is defined as follows:

i U=(total amount of information received during one section (for $T$ seconds))/(the maximum information amount which can be transmitted by using all the resources that the system has)

The unit of the above-mentioned total amount of information and the maximum information amount is bit or packet. The maximum information amount (denominator of the above-mentioned definition formula) is a value of the maximum information amount which can be transmitted by using all the resources during one section (for T seconds) determined by the system design. Re-transmitted information, if any, is included in the total amount of information (numerator of the above-mentioned definition formula) similarly to the above-described case the above-mentioned required communication quality type is the throughput.

Thus, the transmission delay time D of packet is measured for each packet which is received during each observation section of the section span T.

Based on the above definition, a specific example of the calculation method according to the first embodiment will now be described.

According to the first embodiment, the available communication quality value is calculated based on the required communication quality values of the terminals/sessions under connection. The radio resources employed are assumed to be telecommunication channels, in this example.

Ct denotes the maximum information amount (bits or packets) which can be transmitted by all the resources that the system has during one section (T seconds); Dai denotes a permissible delay time (seconds) which the terminal/session (i) currently under connection which has a required communication quality value requires; Da denotes the average value (seconds) of required permissible delay times on all the terminals/sessions currently under connection each having the required quality value; De (seconds) denotes the estimated available delay time for a terminal/session which newly requires connection; and D (seconds) denotes the required permissible delay time on the terminal/session which newly requires connection.

The total amount of information received from all the terminals/sessions is calculated by summing the total amount of information Ci received from terminal/session currently under connection with respect to i=1 through K. Accordingly, the resource usage rate U can be obtained by the following formula (4):

$$U = \frac{\sum_{i=1}^{K} Ci}{Ct} \quad (4)$$

The average Da of the permissible delay times which all the terminals/sessions require is obtained by summing the permissible delay time Dai which the terminal/session (i) currently under connection requires with respect to i=1 through K, and dividing it by K. Accordingly, Da can be obtained by the following formula (5):

$$Da = \frac{\sum_{i=1}^{K} Dai}{K} \quad (5)$$

It is assumed that the resource usage rate which one terminal/session uses is inversely proportional to the delay time. That is, as the rate of resources used by a terminal/session is doubled, for example, the transmission delay time becomes halved. Furthermore, the rate (rate of remaining resource rate) of the remaining resources which can be allocated for terminals/sessions which newly require connection can be expressed as 1−U, and the average resource usage rate per terminal/session can be expressed as U/K. Then, each of the delay time Da occurring when using the resource of U/K and an estimated delay time De occurring when a terminal/session which newly requires connection uses resources of 1−U is inversely proportional to the resource usage rate. Accordingly, the following formula (6) holds, and, therefrom, the following formula (7) is obtained:

$(U/K) \cdot Da = (1-U) \cdot De$ \quad (6)

$De = \{U/(1-U)\} \cdot (Da/K)$ \quad (7)

De is the estimated delay time occurring when a new terminal/session is accepted and inserted. Accordingly, the estimated delay time De is compared with the permissible delay time D. Then, in case $De \leq D$, it is determined that the required communication quality is satisfied. Then, the relevant terminal/session is accepted.

Although De becomes infinite in case U=1, since it can be determined in such a situation that there is no resources left which can be newly used, it is determined that the new terminal/session cannot be accepted.

Thus, when required communication quality is a delay time, unlike the case where it is a throughput, the resource usage rate should be calculated from the total receiving amount of information during one section (for T seconds).

Then, a specific example of calculation method according to the above-mentioned second embodiment will now be described. According to the second embodiment, the available communication quality is calculated based on the communication quality measurement values on the terminal/sessions under connection.

Hereinafter, Dti denotes the total of delay time of packets properly received during one section (for T seconds) from each terminal/session (i) currently under connection having a required communication quality value.

Since Dti is the total of the delay time measured for all the packets received during one section (T seconds), the average delay time Dai of the relevant terminal/session (i) is obtained by Dai=Dti/Ci. Then, average thereof is obtained for all the terminals/sessions currently under connection, as in the above-mentioned formula (5), the following formula (8) is obtained:

$$Da = \frac{\sum_{i=1}^{K} Dai}{K} = \frac{\sum_{i=1}^{K} \frac{Dti}{Ci}}{K} \quad (8)$$

There, U can be similarly expressed as the above-mentioned formula (4). Further, also assuming that each of the delay time Da occurring when using the resources of U/K and the estimated delay time De occurring when the terminal/session which newly requires connection uses the resources of 1−U is in inverse proportion to the resource usage rate, the following formula (9) holds, and, therefrom, the following formula (10) is obtained:

$(U/K) \cdot Da = (1-U) \cdot De$ \quad (9)

$De = \{U/(1-U)\} \cdot (Da/K)$ \quad (10)

De denotes the estimated delay time occurring when the new terminal/session is accepted and inserted. Accordingly, the estimated delay time De and the permissible delay time D are compared, and, then, when $De \leq D$, it is determined that the required communication quality is satisfied, and this terminal/session is accepted.

A specific example of the calculation method according to the above-described third embodiment will now be described. According to the third embodiment, the available communication quality value is calculated based on the required values for terminals/sessions for each of which the measured value exceeds the required value, and on the measured values for terminals/sessions for each of which the measured value is less than the required value. Similarly to the above-described case, terminals/sessions for which the measured value (Dai) is equal to the required value (Ddi) (Ddi=Dai) may be classified into either category, In this example, those are classified into the category where the measured value exceeds the required value.

Hereinafter, Ddi denotes the required permissible delay time on the terminal/session (i) currently on connection for which the measured value exceeds or is equal to the required value; L denotes the number of terminals/sessions currently under connection for each of which the measured value exceeds or is equal to the required value; Daj denotes the measured average delay time on the terminal/session (j) currently on connection for which the measured value is less than the required value; and M denotes the number of those currently under connection for each of which the measured value is less than the required value.

Then, the average delay time Da is obtained by the following formula (11):

$$Da = \frac{\sum_{i=1}^{L} Ddi + \sum_{j=1}^{M} Daj}{R} = \quad (11)$$

There, U can be similarly expressed as the above-mentioned formula (4). Further, also assuming that each of the delay time Da occurring when using the resources of U/K and the estimated delay time De occurring when the terminal/session which newly requires connection use the resources of 1−U is in inverse proportion to the resource usage rate, the following formula (12) holds, and, therefrom, the following formula (13) is obtained:

$$(U/K) \cdot Da = (1-U) \cdot De \qquad (12)$$

$$De = \{U/(1-U)\} \cdot (Da/K) \qquad (13)$$

De denotes the estimated delay time occurring when a new terminal/session is accepted and inserted. Accordingly, the estimated delay time De and the permissible delay time D are compared, and, then, when $De \leq D$, it is determined that the required communication quality is satisfied, and this terminal/session is accepted.

Thus, the calculate methods in cases where the permissible delay time is employed as the communication quality type (or parameter) have been described.

Although the cases where the required communication quality which the terminal/session which newly requires connection have is ① the throughput or ② the permissible delay time have been described, it is also possible to employ parameters other than those through all the embodiments.

In addition, in the above description of each embodiment, although the fixed base station apparatus containing the acceptance control apparatus according to the present invention has been described, the communication apparatus such as a base station apparatus may be an apparatus which functions as a base station in a communication system, and, thus, it should not be limited to an apparatus in such a fixed station.

Moreover, as described above, an acceptance control apparatus according to the present invention may be provided at any position in a radio communication system as long as it functions to control new connection, and it is not necessary to be limited to the above-mentioned case where it is provided in the fixed base station apparatus. It is clear that, even when an acceptance control apparatus according to the present invention is provided at any station and in any apparatus, the objects of the present invention can be attained by the substantially same scheme.

Further, the present invention is not limited to the above-described embodiments, and variations and modifications may be made without departing from the scope of the present invention.

The present application is based on Japanese priority application No. 2000-402957, filed on Dec. 28, 2000, the entire contents of which are hereby incorporated by reference.

What is claimed is:

1. An acceptance control apparatus, used in a radio communication system, comprising:
   a receiving part which receives a connection request signal and a required communication quality value from a new terminal establishing a new connection;
   a request quality holding part which holds required communication quality values on terminals for each connection that has been accepted; and
   a determination part which determines acceptance/refusal of the connection for the new terminal;
   wherein:
   said determination part obtains an available communication quality value from the required communication quality values of the terminals currently connected held by said request quality holding part and a maximum permissible communication quality value of said radio communication system, and, when said available communication quality value satisfies the required communication quality value of the new terminal, said determination part accepts the connection for said new terminal.

2. An acceptance control apparatus, used in a radio communication system, comprising:
   a receiving part which receives a connection request signal and a required communication quality value from a new terminal establishing a new connection;
   a quality measuring and holding part which obtains a communication quality type of the required communication quality of the new terminal received by said receiving part, measures the communication quality values on the terminals currently connected for the thus-obtained communication quality type, and holds the measurement values; and
   a determination part which determines acceptance/refusal of the connection for the new terminal;
   wherein:
   said determination part calculates an available communication quality value from the measurement values of the communication quality type held by said quality measuring and holding part and a maximum permissible communication quality value of said radio communication system, and, when said available communication quality value satisfies the required communication quality value of the new terminal, said determination part accept the connection for said new terminal.

3. An acceptance control apparatus, used in a radio communication system, comprising:
   a receiving part which receives a connection request signal and a required communication quality value from a new terminal establishing a new connection;
   a request quality holding part which holds required communication quality values on terminals for each connection that has been accepted; and
   a quality measuring and holding part which obtains a communication quality type of the required communication quality of the new terminal received by said receiving part, measures the communication quality values on the terminals currently connected for the thus-obtained communication quality type, and holds the measurement values; and a determination part which determines acceptance/refusal of the connection for the new terminal;
   wherein:
   said determination part calculates an available communication quality value from the required communication quality values of the terminals currently connected for the terminal for each of which the measurement value is more superior than the required value held by said request quality holding part, the measurement values of the communication quality type for the terminals for each of which the measurement value is less superior than the required value held by said quality measuring and holding part, and a maximum permissible communication quality value of said radio communication system, and;
   when said available communication quality value satisfies the required communication quality value of the new terminal, said determination part accept the connection for said new terminal.

4. The acceptance control apparatus as claimed in claim 1, wherein:
   a throughput value is employed as the communication quality value for determining acceptance/refusal of connection of the new terminal.

5. The acceptance control apparatus as claimed in claim 1, wherein:
a delay time value is employed as the communication quality value for determining acceptance/refusal of connection of the new terminal.

6. The acceptance control apparatus as claimed in claim 2, wherein:
a throughput value is employed as the communication quality value for determining acceptance/refusal of connection of the new terminal.

7. The acceptance control apparatus as claimed in claim 2, wherein:
a delay time value is employed as the communication quality value for determining acceptance/refusal of connection of the new terminal.

8. The acceptance control apparatus as claimed in claim 3, wherein:
a throughput value is employed as the communication quality value for determining acceptance/refusal of connection of the new terminal.

9. The acceptance control apparatus as claimed in claim 3, wherein:
a delay time value is employed as the communication quality value for determining acceptance/refusal of connection of the new terminal.

10. An acceptance control method, used in a radio communication system, comprising the steps of:
a) receiving a connection request signal and a required communication quality value from a new terminal establishing a new connection;
b) holding required communication quality values on terminals for each connection that has been accepted; and
c) determining acceptance/refusal of the connection for the new terminal;
wherein:
said step c) obtains an available communication quality value from the required communication quality values on the terminals currently connected held by said request quality holding part and a maximum permissible communication quality value of said radio communication system, and, when said available communication quality value satisfies the required communication quality value of the new terminal, said step c) accepts the connection for said new terminal.

11. An acceptance control method, used in a radio communication system, comprising the steps of:
a) receiving a connection request signal and a required communication quality value from a new terminal establishing a new connection;
b) obtaining a communication quality type of the required communication quality of the new terminal received by said step a), measuring the communication quality values on terminals currently connected for the thus-obtained communication quality type, and holding the thus-obtained measurement values; and
c) determining acceptance/refusal of the connection for the new terminal;
wherein:
said step c) calculates an available communication quality value from the measurement values of the communication quality type held by said step b) and a maximum permissible communication quality value of said radio communication system, and, when said available communication quality value satisfies the required communication quality value of the new terminal, said step c) accepts the connection for said new terminal.

12. An acceptance control method, used in a radio communication system, comprising the steps of:
a) receiving a connection request signal and a required communication quality value from a new terminal establishing a new connection;
b) holding required communication quality values on terminals for each connection that has been accepted;
c) obtaining a communication quality type of the required communication quality of the new terminal received by said step a), measuring the communication quality values on terminals currently connected for the thus-obtained communication quality type, and holding the thus-obtained measurement values; and
d) determining acceptance/refusal of the connection for the new terminal;
wherein:
said step d) calculates an available communication quality value from the required communication quality values of the terminals currently connected for the terminal for each of which the measurement value is more superior than the required value held by said step b), the measurement values of the communication quality type for the terminal for each of which the measurement value is less superior than the required value held by said step c), and a maximum permissible communication quality value of said radio communication system, and;
when said available communication quality value satisfies the required communication quality value of the new terminal, said step d) accepts the connection for said new terminal.

13. The acceptance control method as claimed in claim 10, wherein:
a throughput value is employed as the communication quality value for determining acceptance/refusal of connection of the new terminal.

14. The acceptance control method as claimed in claim 10, wherein:
a delay time value is employed as the communication quality value for determining acceptance/refusal of connection of the new terminal.

15. The acceptance control method as claimed in claim 11, wherein:
a throughput value is employed as the communication quality value for determining acceptance/refusal of connection of the new terminal.

16. The acceptance control method as claimed in claim 11, wherein:
a delay time value is employed as the communication quality value for determining acceptance/refusal of connection of the new terminal.

17. The acceptance control method as claimed in claim 12, wherein:
a throughput value is employed as the communication quality value for determining acceptance/refusal of connection of the new terminal.

18. The acceptance control method as claimed in claim 12, wherein:
a delay time value is employed as the communication quality value for determining acceptance/refusal of connection of the new terminal.

* * * * *